(12) United States Patent
Shinohara et al.

(10) Patent No.: US 8,387,466 B2
(45) Date of Patent: Mar. 5, 2013

(54) ELECTRIC PART PROTECTION MEMBER AND ASSEMBLING METHOD THEREFOR

(75) Inventors: Tatsuya Shinohara, Nagano (JP); Takahiro Nishigaki, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 457 days.

(21) Appl. No.: 12/690,356

(22) Filed: Jan. 20, 2010

(65) Prior Publication Data
US 2010/0180690 A1   Jul. 22, 2010

(30) Foreign Application Priority Data

Jan. 22, 2009  (JP) ................................. 2009-011825
Jan. 22, 2009  (JP) ................................. 2009-011826

(51) Int. Cl.
*G01L 7/00* (2006.01)
*H01R 11/30* (2006.01)

(52) U.S. Cl. ........................................... 73/756; 439/39
(58) Field of Classification Search ............. 73/700–756
See application file for complete search history.

(56) References Cited

U.S. PATENT DOCUMENTS

| | | | |
|---|---|---|---|
| 2011/0136351 A1* | 6/2011 | Rohrbach et al. | 439/39 |
| 2011/0269325 A1* | 11/2011 | Gosis et al. | 439/265 |
| 2012/0083137 A1* | 4/2012 | Rohrbach et al. | 439/39 |
| 2012/0090114 A1* | 4/2012 | Keefe et al. | 15/105 |
| 2012/0135622 A1* | 5/2012 | Melni | 439/271 |

FOREIGN PATENT DOCUMENTS

| | | |
|---|---|---|
| JP | 2204982 | 8/1990 |
| JP | 3-53774 | 5/1991 |
| JP | 3009610 | 1/1995 |
| JP | 2000055762 | 2/2000 |
| JP | 2002124339 | 4/2002 |
| JP | 2002168711 | 6/2002 |
| JP | 2004-025944 | 1/2004 |
| JP | 2006038538 | 2/2006 |
| JP | 2008155674 | 7/2008 |
| JP | 2010167889 | 8/2010 |
| WO | WO2007/048438 | 5/2007 |

OTHER PUBLICATIONS

Japanese Office Action for corresponding Japanese Appl. No. 2009-011825, Drafting date Jan. 12, 2011, Dispatch date Jan. 18, 2011 (English Translation).
Japanese Office Action for corresponding Japanese Appl. No. 2009-011826, Drafting date Jan. 12, 2011, Dispatch date Jan. 18, 2011 (English Translation).
Japanese Patent Office Action for Application No. 2011-058130, drafting date—Dec. 3, 2012, date of dispatch—Dec. 11, 2012, 7 pages.

* cited by examiner

*Primary Examiner* — Andre Allen
(74) *Attorney, Agent, or Firm* — Andrew M. Calderon; Roberts Mlotkowski Safran & Cole, P.C.

(57) ABSTRACT

An electric part protection member for a projecting contact terminal which projects from a supporting portion of an electric part, includes a bottomed cylindrical cap portion, adapted to be detachably placed over the supporting portion, wherein: the cap portion is formed of a conductive member; and when the cap portion is placed over the supporting portion, the cap portion is electrically connected to a housing of the electric part, and the contact terminals are spaced apart from the cap portion.

20 Claims, 7 Drawing Sheets

ELECTRIC PART PROTECTION MEMBER AND ASSEMBLING METHOD THEREFOR

BACKGROUND

1. Field of the Invention

The present invention relates to a projection member mounted on an electric part.

2. Description of the Related Art

In a vehicle brake fluid pressure controlling unit for controlling brake fluid pressures which are applied to wheel brakes in a vehicle's brake system, a control unit controls various types of parts which are provided along fluid lines based on a brake fluid pressure measured by a pressure sensor. An on-board pressure sensor includes a cylindrical sensor housing which accommodates an electric circuit, a supporting portion which projects from an opening portion of the housing, and a plurality of contact probes (contact terminals) which are inserted through insertion holes in the supporting portion. Distal end portions of the contact probes project from a distal end face of the supporting portion, while proximal end portions thereof are connected to the electric circuit within the sensor housing.

The pressure sensor is inserted, at a proximal end portion thereof, into a mounting hole in a base body in which a brake fluid line is formed to thereby be secured to the base body. The distal end portions of the contact probes which project at a distal end side of the pressure sensor contact connecting portions of a control circuit board, whereby the pressure sensor and the control circuit board are electrically connected together (for example, refer to JP-A-2004-25944).

In the conventional pressure sensor described above, since the contact probes are set individually to negative poles or positive poles, when the pressure sensor is assembled to the base body, the pressure sensor needs to be assembled in a predetermined orientation so that the contact probes are electrically connected to the connecting portions of the control circuit board in a proper fashion. Then, in the conventional pressure sensor, a cut-out plane is formed in an outer circumferential surface of the supporting portion, and when the pressure sensor is assembled to the base body, the pressure sensor is accurately assembled to the base body by grasping the arrangement of the contact probes using the cut-out plane as a mark.

Since the cut-out plane needs to be exposed to the outside in order for the cut-out plane in the supporting portion to function as the mark, the contact probes also have to be exposed to the outside, and dirt such as grease or dust is made easy to stick to the contact probes so exposed.

When the conventional pressure described above is assembled to the base body, in the event that a static electricity of a high voltage flows to the respective contact probes from the outside, the static electricity flows from the respective contact probes to the electric circuits accommodated within the sensor housing, leading to a likelihood of a failure being produced in the pressure sensor. In the event that the contact probes are exposed to the outside, dirt such as grease or dust becomes easy to static to the contact probes.

SUMMARY

An object of the invention is to provide a protection member which can solve the aforesaid problem, prevent the sticking of the dirt to contact terminals of an electric part and grasp the arrangement of the contact terminals.

Further, an object of the invention is to provide a protection member which can solve the aforesaid problem and prevent not only an electric part from being affected by static electricity but also sticking of dirt to contact terminals of the electric part when the electric part is assembled on to an other different part, and an assembling method therefor.

According to a first aspect of the invention, there is provided an electric part protection member for a projecting contact terminal which projects from a supporting portion of an electric part, including a bottomed cylindrical cap portion, adapted to be detachably placed over the supporting portion, wherein: the cap portion is formed of a conductive member; and when the cap portion is placed over the supporting portion, the cap portion is electrically connected to a housing of the electric part, and the contact terminals are spaced apart from the cap portion.

According to a second aspect of the invention, there is provided an assembling method for an electric part, including: placing a cap portion of a protection member for a projecting contact terminal which projects from a supporting portion of an electric part, including a bottomed cylindrical cap portion adapted to be detachably placed over the supporting portion, on the supporting portion of the electric part; and mounting the housing of the electric part on an other different part in a state that the cap portion is placed over the supporting portion, wherein: the cap portion is formed of a conductive member; when the cap portion is placed over the supporting portion, the cap portion is electrically connected to a housing of the electric part, and the contact terminals are spaced apart from the cap portion; and when the mounting, static electricity, which flows to the cap portion from the outside, is released from the housing of the electric part via the other different part so that the cap portion is grounded.

In these configurations, in the event that static electricity flows to the cap portion of the protection member from the outside when the electric part is assembled on to the other different part, since the static electricity is released from the housing of the electric part via the other different part so that the cap portion is grounded, electric circuits accommodated within the housing can be prevented from being affected by the static electricity. Since the contact terminals of the electric part are not exposed to the outside by the cap portion of the protection member being placed over the supporting portion of the electric part, sticking of dirt to the contact terminals can be prevented.

The electric part protection member may further includes: an engagement portion, formed on an inner circumferential surface of the cap portion, the engagement portion being adapted to be brought into engagement with a positioning portion formed on an outer circumferential surface of the supporting portion; and a mark, indicating a position of the engagement portion, the mark being provided on an outer surface of the cap portion.

In this configuration, a rotation preventive construction for the cap portion which is placed over the supporting portion is configured by bringing the engagement portion of the cap portion into engagement with the positioning portion of the supporting portion of the electric part. Further, since the mark indicating the position of the engagement portion is provided on the outer surface of the cap portion, even in such a state that the cap portion is placed over the supporting portion, the arrangement of the contact terminals accommodated in the interior of the cap portion can be grasped by using the mark provided on the outer surface of the cap portion as a marking. Consequently, in the invention, the electric part can accurately assembled to an other different part with the contact terminals of the electric part accommodated in the interior of the cap portion. When the cap portion of the protection member is placed over the supporting portion in a fabrication process of the electric part, there is produced no such situation that the contact terminals are exposed to the outside from the fabrication process to the assembling process. Therefore, the sticking of dirt to the contact terminals can be prevented in an ensured fashion.

The cap, portion may be a bottomed cylindrical member, and the mark may be a flat plane formed on part of an outer circumferential surface of the cap portion.

In this configuration, since the mark can easily be formed on the cap portion and is easy to be recognized, the assembling efficiency can be improved. When the flat plane is formed on the part of the outer circumferential surface of the cap portion by forming flat plate-like portions on a front and rear of a circumferential wall portion of the cap portion, the rotation preventive construction for the cap portion which is placed over the supporting portion can be configured by the engagement of the non-circular positioning portion which is formed on the outer circumferential surface of the supporting portion of the electric part and the non-circular flat portion formed on the inner circumferential surface of the cap portion.

The electric part protection member may further include a projecting portion, formed on the inner circumferential surface of the cap portion in a position which confronts the engagement portion.

In this configuration, since the projecting portion formed on the inner circumferential surface of the cap portion is pressed against the outer circumferential surface of the supporting portion when the cap portion of the protection member is placed over the supporting portion of the electric part, the cap portion can be fitted on the supporting portion with a sufficient pressure, whereby the engagement portion of the cap portion and the positioning portion of the supporting portion can be brought into engagement with each other in an ensured fashion.

The projecting portion may be extended from an opening portion of the cap portion towards a bottom portion side, with a larger extending amount on the bottom portion side than an opening portion side.

In this configuration, when the cap portion of the protection member is placed over the supporting portion of the electric part, since the projecting amount of the projection portion is smaller on the opening portion side of the cap portion, the supporting portion can smoothly be inserted into the interior of the cap portion. In addition, the projecting amount of the projecting portion is larger on the bottom portion side of the cap portion, the cap portion can be fitted on the supporting portion with the sufficient pressure.

The cap portion may be formed with a slit extended from the opening portion to the bottom portion side.

In this configuration, even in the event that an interference between the cap portion and the supporting portion is small due to dimensional tolerance of an inside diameter of the cap portion or an outside diameter of the supporting portion of the electric part, the inside diameter of the cap portion is increased by the slit being opened in a width direction when the cap portion is placed over the supporting portion, whereby the supporting portion can smoothly be inserted into the interior of the cap portion.

The electric part protection member may further include a locking portion, formed on the outer circumferential surface of the cap portion, the locking portion being a raised portion extended in a circumferential direction. Further, the electric part protection member may further include a locking portion, formed on the outer circumferential surface of the cap portion, the locking portion being a recessed portion extended in a circumferential direction.

In this configuration, when the cap portion of the protection member is placed over and off the supporting portion, gripping the locking portion of the cap portion facilitates the attachment and detachment of the cap portion to and from the supporting portion.

The cap portion may be formed by a conductive member and may be electrically connected with a housing of the electric part.

In this configuration, since static electricity which flows to the cap portion of the protection member from the outside is released from the housing of the electric part via an other different part so that the cap portion is grounded, the electric circuits accommodated within the housing can be prevented from being affected by static electricity.

The electric part may be a pressure sensor for use in a vehicle brake fluid pressure controlling unit and may be designed to measure a brake fluid pressure within a fluid line which connects a master cylinder with a wheel brake.

In this configuration, the electric part can accurately be assembled to the vehicle brake fluid pressure controlling unit in such a state that the contact terminals of the electric part are accommodated in the interior of the cap portion of the protection member, so as to prevent dirt such as grease from sticking to the contact terminals, whereby the quality of the vehicle brake fluid pressure controlling unit can be increased.

According to the electric part protection member of the invention, even in such a state that the cap portion of the protection member is kept placed over the supporting portion of the electric part, the orientation of the electric part can be grasped, whereby the electric part can accurately be assembled to another part with the contact terminals accommodated in the interior of the cap portion.

Further, according to the electric part protection member and the assembling method therefor of the invention, not only can the electric part be prevented from being affected by static electricity but also sticking of dirt to the contact terminals of the electric part can be prevented.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 3A and 3B are drawings showing a pressure sensor of the embodiment, of which

FIGS. 6A to 6C are drawings showing the protection member of the embodiment, of which

DETAILED DESCRIPTION OF THE INVENTION

Next, referring to the drawings as required, an embodiment of the invention will be described in detail.

Figure 1:
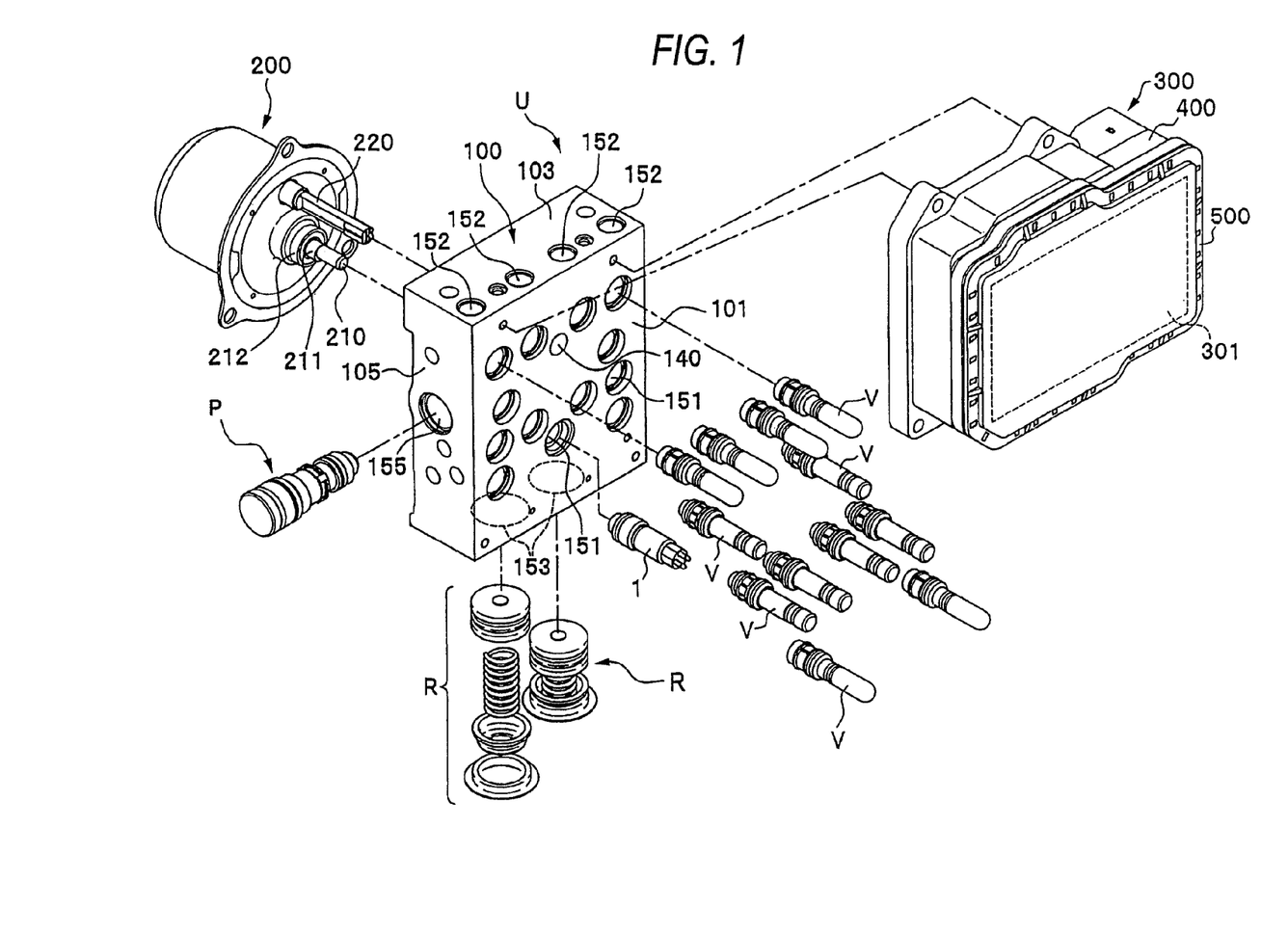
FIG. 1 is an exploded perspective view showing a vehicle brake fluid pressure controlling unit of an embodiment of the invention.

A vehicle brake fluid pressure control apparatus U mainly includes, as is shown in FIG. 1, a base body 100 to which an electric part such as a pressure sensor 1 and electromagnetic valves V, a motor 200 and a reciprocating pump P are assembled, and an electronic control unit 300 having a control circuit board 301 for controlling opening and closing of the electromagnetic valves V and operation of the motor 200 by detecting a behavior of a vehicle body. Brake fluid lines (oil lines) are formed in the base body 100, and the control circuit board 301 actuates the electromagnetic valves V and the motor 200 based on the behavior of the vehicle body, so as to change a brake fluid pressure within the brake fluid lines.

As is shown in FIG. 1, the base body 100 is a metallic part which is formed substantially into a rectangular parallelepiped, and the brake fluid lines (oil lines) are formed in an interior thereof. A plurality of bottomed mounting holes 151 in which the electromagnetic valves V and the pressure sensor 1 are mounted are formed in a front side surface 101 of respective surfaces of the base body 100. Outlet ports 152 to which brake lines reaching wheel brakes (not shown) are connected are formed in an upper surface 103 of the base body 100. Two reservoir holes 153 into which reservoir constituent parts R which make up a reservoir are assembled are formed on a lower surface of the base body 100. A pump hole 155 in which the reciprocating pump P is mounted is formed in a lateral side surface 105 of the base body 100. The holes provided in the base body 100 are made to communicate with each other directly or via the brake fluid lines, not shown, which are formed in an interior of the base body 100.

Figure 2:
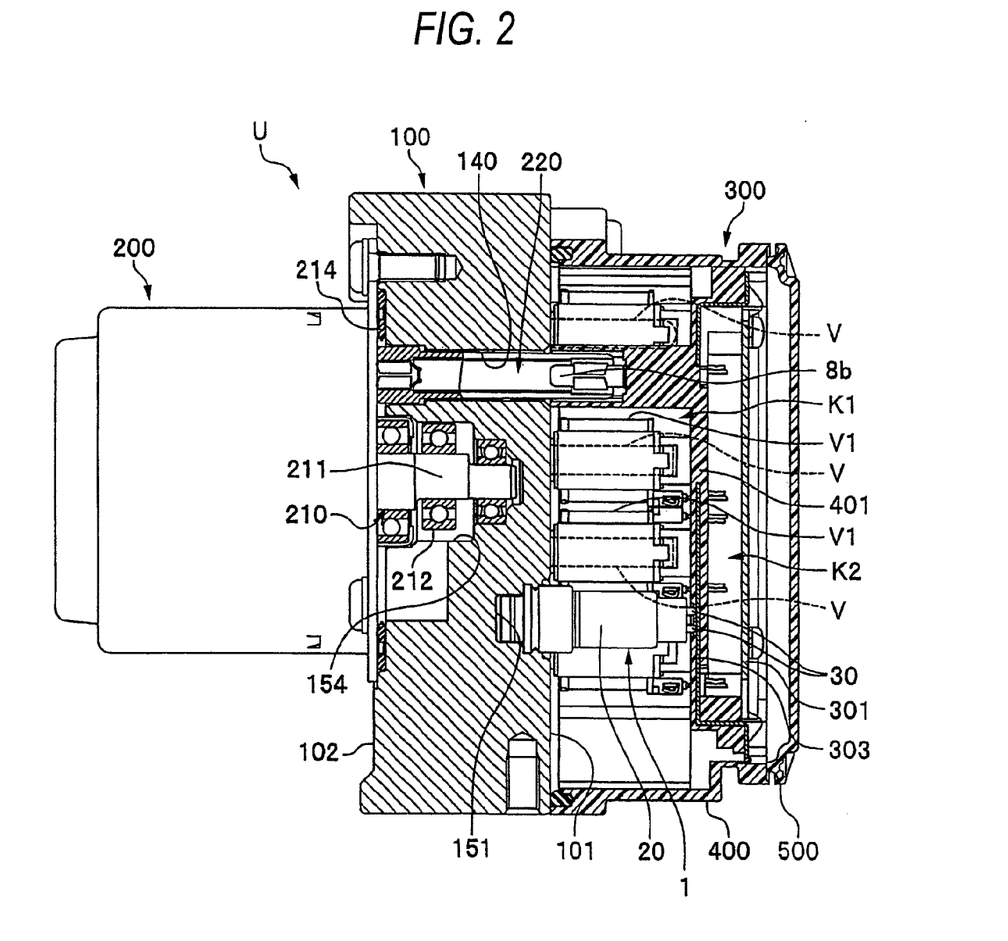
FIG. 2 is a side sectional view showing the vehicle brake fluid pressure controlling unit of the invention.

The motor 200 is an electric part which constitutes a power source for the reciprocating pump P and is integrally secured to a rear side surface 102 of the base body, as is shown in FIG. 2. An endless seal member 214 is interposed between the motor 200 and the rear side surface 102 of the base body 100 for fluid-tightly sealing a gap between the motor 200 and the rear side surface 102 of the base body 100. An eccentric shaft portion 211 is provided on an output shaft 210 of the motor 200, and a ball bearing 212 is fitted on the eccentric shaft portion 211. The eccentric shaft portion 211 and the ball bearing 212 are inserted into a motor mounting hole 154 in the base body 100. A motor bus bar 220 is connected on the output shaft 210 for supplying electric power to a rotor, not shown. The motor bus bar 220 is inserted through a terminal hole 140 in the base body 100 and is connected to the control circuit board 301 via a terminal 8b provided within a housing 400.

The electronic control unit 300 includes, as shown in FIG. 1, the control circuit board 301, the housing 400 which accommodates the electronic parts projecting from the base body 100 and the control circuit board 301 and a cover 500 which closes an opening in the housing 400.

Figure 4:
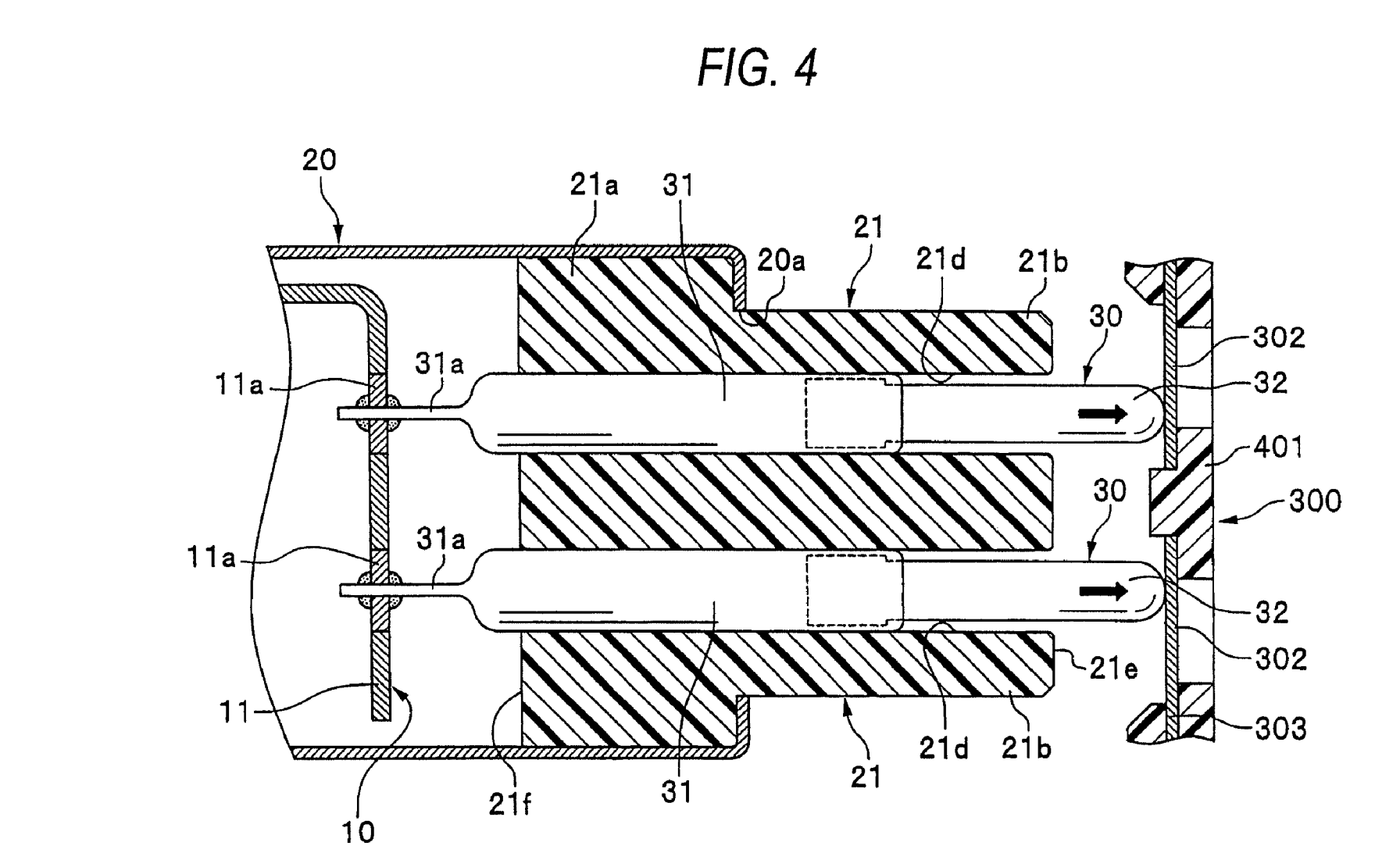
FIG. 4 is a partially enlarged sectional view showing the pressure sensor of the embodiment.

The control circuit board 301 is such that electronic parts such as semiconductor chips are mounted on a rectangular circuit board main body on which electric circuits are printed and is configured to control opening and closing of the electromagnetic valves V and operation of the motor 200 based on information obtained from various sensors such as the pressure sensor 1, as well as an angular velocity sensor and an acceleration sensor which are not shown and programs stored in advance. As is shown in FIG. 2, a conductive member 303 embedded in the housing 400 is connected to the electric circuits on the circuit board 301. This conductive member 303 is provided to extend within a partitioning portion 401 which is formed closer to the base body 100 than the control circuit board 301, and as is shown in FIG. 4, connecting portions 302 are formed on part of a side of the partitioning portion 401 which confronts the base body 100. Contact probes 30 of the pressure sensor 1 contact the corresponding connecting portions 302, whereby the pressure sensor 1 and the control circuit board 301 (refer to FIG. 2) are connected electrically.

As is shown in FIG. 2, the housing 400 is a box member made of a synthetic resin which is integrally secured to a front side surface 101 of the base body 100 in such a state that the housing 400 covers the electric parts such as the electromagnetic valves V and the pressure sensor 1 which project from the front side surface 101 of the base body 100. This housing 400 is opened on a side facing the base body 100 (a left-hand side in FIG. 2) and a side opposite to the side facing the base body 100 (a right-hand side in FIG. 2). An interior space of the housing 400 is divided into a front side and a rear side by the partitioning portion 401. A first accommodation compartment K1 is formed on the rear side (the left-hand in FIG. 2) of the interior space for accommodating the electric parts such as the magnetic valves V, magnetic coils V1 and the pressure sensor 1, and a second accommodation compartment K2 is formed on the front side (the right-hand in FIG. 2) of the interior space for accommodating the control circuit board 301.

As is shown in FIG. 1, the cover 500 is a lid member made of a synthetic resin which is adapted to tightly close the opening formed on the side of the housing 400 which is opposite to the side facing the base body 100 and is secured to a front side end face of the housing 400 by means of welding or bonding.

The pressure sensor shown in FIG. 2 is an electric part for measuring brake fluid pressures within fluid lines connecting a master cylinder with wheel brakes, both of which are not shown. A distal end portion (an end portion facing the base body 100) of the pressure sensor 1 is inserted into a mounting hole 151 formed in the front side surface 101 of the base body 100, whereby the pressure sensor 1 is secured to the front side surface of the base body 100.

Figure 3A:
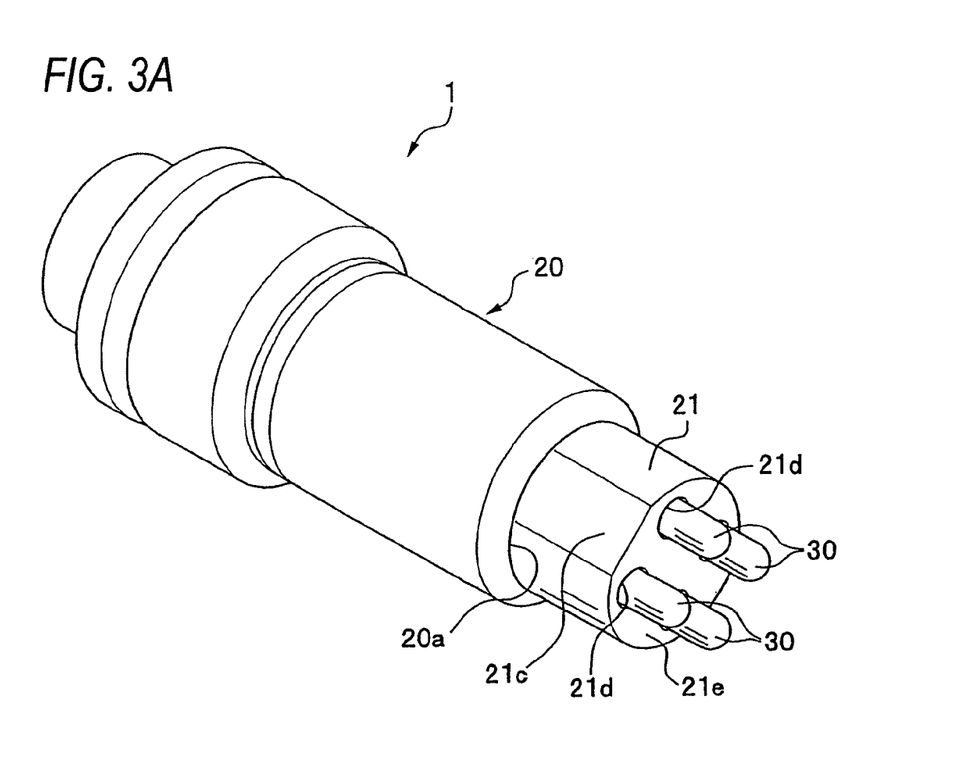
FIG. 3A is a perspective view.

As is shown in FIG. 3A, the pressure sensor 1 includes a sensor housing 20 which accommodates a detecting portion 10 (refer to FIG. 4) for measuring brake fluid pressures within the flow lines formed within the base body 100, a supporting portion 21 which is inserted through an opening portion 20a in the sensor housing 20 and whose distal end portion projects from the opening portion 20a, and the four contact probes 30 which are inserted into four insertion holes 21d which are formed in the supporting portion 21.

The sensor housing 20 is a bottomed cylindrical metallic part, has the opening portion 20a formed at a distal end side and accommodates the detecting portion 10 (refer to FIG. 4) at a proximal end side thereof.

The supporting portion 21 is a resin part of a substantially circular cross section which supports the contact probes 30 and has, as is shown in FIG. 4, a large diameter portion 21a which is inserted into the sensor housing 20 and a small diameter portion 21b which projects outwards through the opening portion 20a in the sensor housing 20. As is shown in FIGS. 3A and 3B, a positioning portion 21c is formed on the small diameter portion 21b by cutting out part of an outer circumferential surface of the small diameter portion 21b into a flat plane.

Figure 3B:
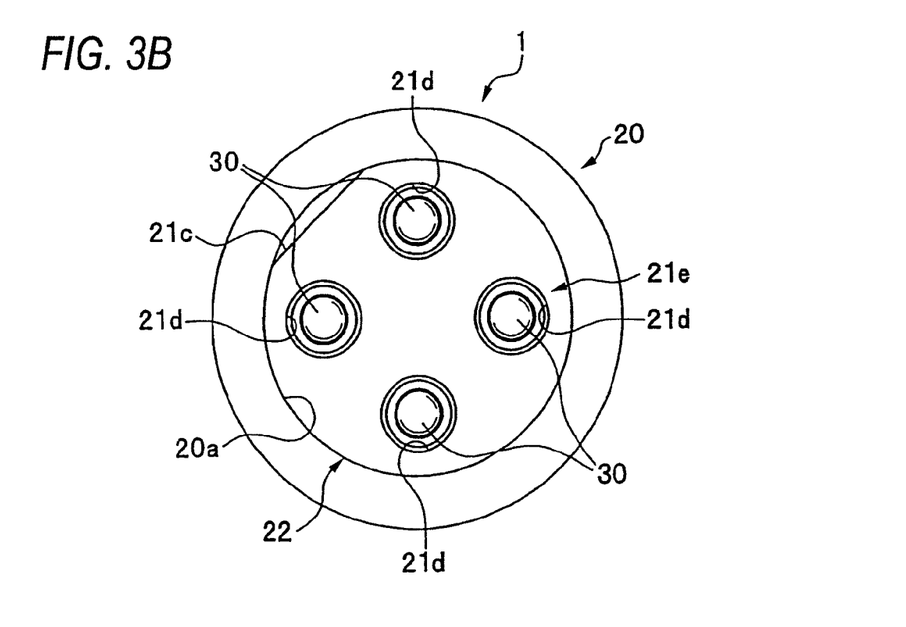
FIG. 3B is a view as seen from a contact probe side.

As is shown in FIG. 3B, the four insertion holes 21d are formed in the supporting portion 21 so as to penetrate therethrough in an axial direction (refer to FIG. 4). The respective insertion holes 21d are disposed about a central point of a distal end face 21e of the supporting portion 21 on the same circumferential line at intervals of 90 degrees.

As is shown in FIG. 4, the detecting portion 10 is accommodated in the sensor housing 20 for detecting brake fluid pressures in the fluid lines so as to convert the detected values into electric signals for output. A circuit board 11 is disposed on the detecting portion 10 in a position which confronts a proximal end face 21f of the supporting portion 21. Electric circuits are printed on the circuit board 11, and semiconductor chips are installed thereon. Four connecting portions 11a (only two are shown in FIG. 4) are formed on the circuit board 11. These connecting portions 11a are caused to communicate electrically with the electric circuits, and by end portions of the contact probes 30 coming into contact therewith, the connecting portions 11a electrically connect the contact probes 30 with the electric circuits. The four connecting portions 11a are individually set to positive poles or negative poles and fluid press signal output portions and diagnosis output portions.

The contact probe 30 has a bottomed cylindrical metallic outer shell portion 31 and a rod 32 which is inserted into the outer shell portion 31, and a coil spring (not shown) is accommodated within the outer shell portion 31.

The outer shell portion 31 has an opening portion formed at a distal end side (a side confronting the electronic control unit 300) and the rod 32 is inserted into this opening portion. A diametrically contracted portion is formed along an opening edge of the outer shell portion 31 which is configured as a portion which prevents dislocation of the rod 32 from the outer shell portion 31. A projecting portion is formed at a proximal end portion of the outer shell 31 so as to project in a rod-like fashion. As is shown in FIG. 4, when the contact probe 30 is inserted into the insertion hole 21d in the supporting portion 21, the outer shell portion 31 is press fitted in the insertion hole 21d, whereby the contact probe 30 is fixed in place in the insertion hole 21d. The proximal end portion of the outer shell portion 31 projects from the proximal end face 21f of the supporting portion 21, and a projecting portion 31a is connected rigidly to the connecting portion 11a of the circuit board 11 of the detecting portion 10 by means of welding, whereby the contact probe 30 is connected electrically with the detecting portion 10.

The rod 32 is biased in a direction in which it projects from the outer shell portion 31 (rightwards in FIG. 4) by virtue of a pressing force of the coil spring (not shown) in the outer shell portion 31, and a distal end portion of the rod 32 projects from the distal end face 21e of the supporting portion 21. The rod 32 has a large diameter portion which is inserted slidably into the outer shell portion 31 and a small diameter portion which projects outwards through the opening portion of the outer shell portion 31. Then, a stepped portion formed between the large diameter portion and the small diameter portion is locked on the diametrically contracted portion of the outer shell portion 31, whereby the rod 32 is prevented from being dislocated from the outer shell portion 31.

Next, a protection member 40 of the pressure sensor 1 will be described. The protection member 40 shown in FIG. 5 includes a bottomed cylindrical cap portion 41 which is detachably placed over a distal end portion of the supporting portion 21 of the pressure sensor 1. This cap portion 41 is made up of a synthetic resin member having electrical conductivity.

Figure 5:
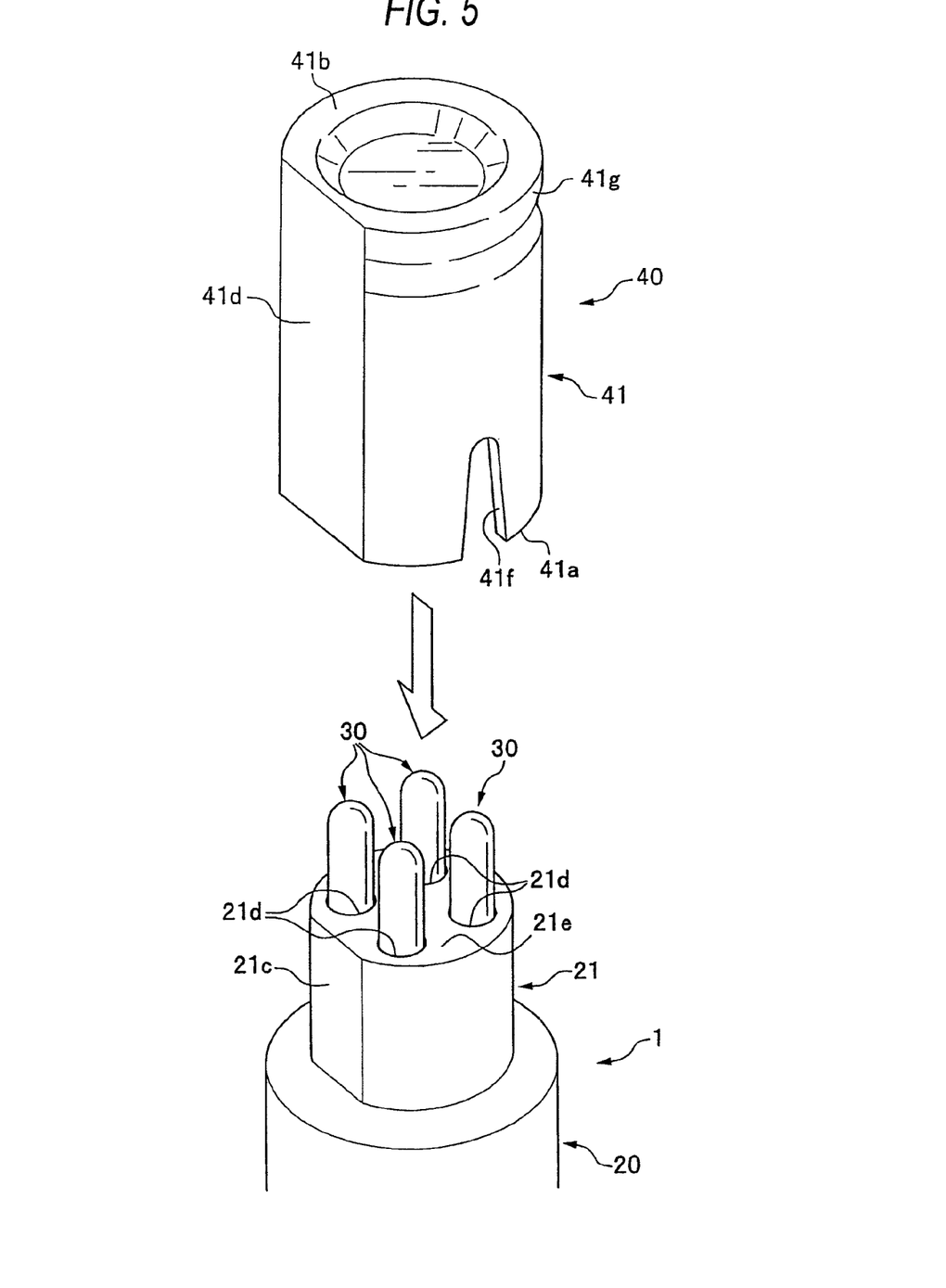
FIG. 5 is a perspective view showing a protection member of the embodiment.
Figure 6A:
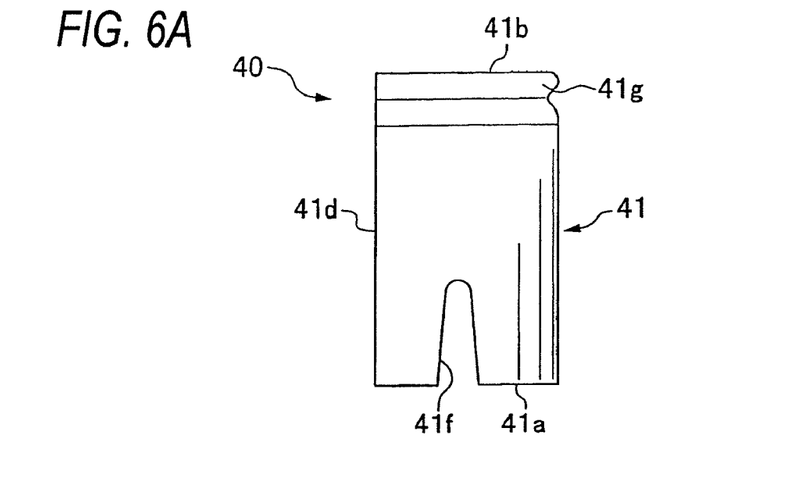
FIG. 6A is a side view.
Figure 6B:
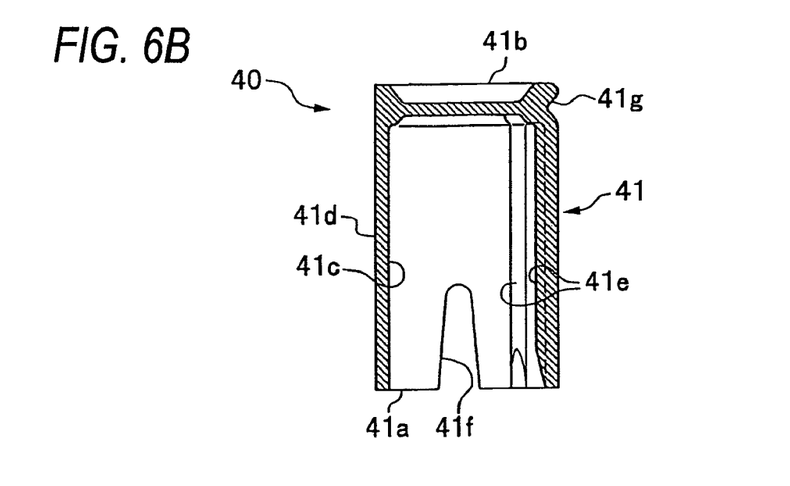
FIG. 6B is a side sectional view.
Figure 6C:
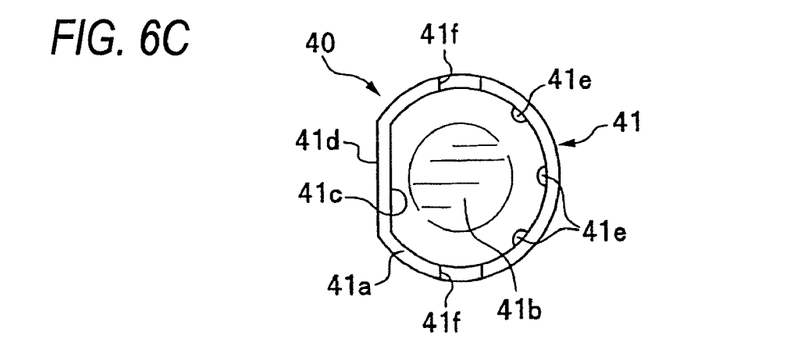
FIG. 6C is a view as seen from an opening portion side.

As is shown in FIG. 6B, an opening portion 41a is formed at one end side (a lower side in FIG. 6B) of the cap portion, and a bottom portion 41b is formed at the other end side (an upper side in FIG. 6B). As is shown in FIG. 6C, an inner circumferential surface of the opening portion 41a has a cross-sectional shape which matches an external shape of the supporting portion 21 of the pressure sensor 1 (refer to FIG. 5), so that the cap portion 41 can be fitted on the supporting portion 21.

Figure 7:
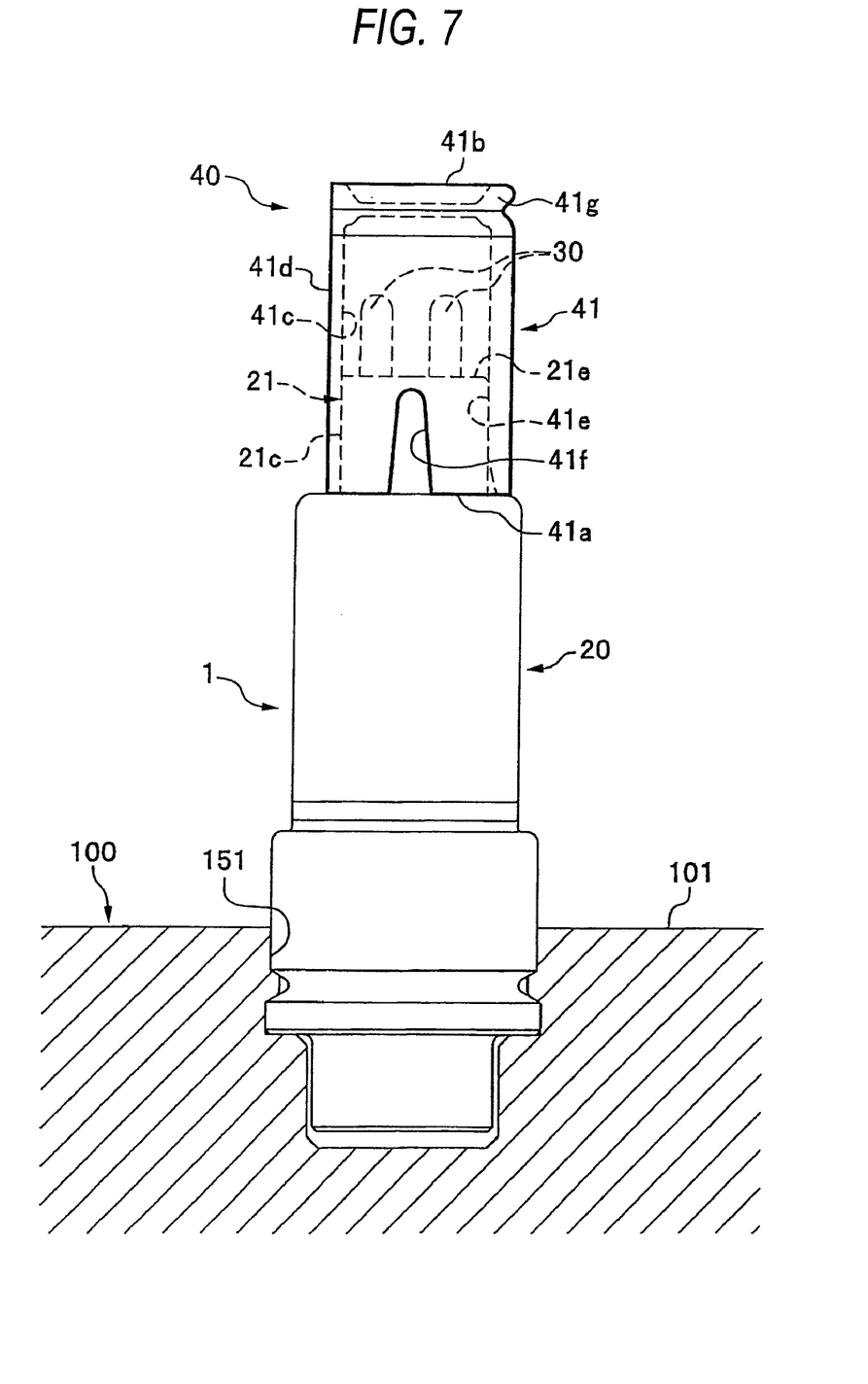
FIG. 7 is a side view showing the pressure sensor on which the protection member of the embodiment is mounted.

As is shown in FIG. 7, when the cap portion 41 is placed over the distal end portion of the supporting portion 21 of the pressure sensor 1, an edge portion of the opening portion 41a of the cap portion 41 is brought into abutment with a distal end face of the sensor housing 20, and the respective distal end portions (the exposed portions) of the contact probes 30 which project from the distal end face 21e of the supporting portion 21 are accommodated within the cap portion 41, while the respective contact probes 30 are spaced apart from the inner circumferential surface of the cap portion 41. Since the cap portion has electrical conductivity, when the cap portion 41 is placed over the supporting portion 21, the cap portion 41 is electrically connected to the sensor housing 20.

As is shown in FIGS. 6A and B, an engagement portion 41c is formed on part of the inner circumferential surface of the cap portion 41. This engagement portion 41c is formed into a flat plane and is configured as a portion which is brought into surface contact with the positioning portion 21c of the supporting portion when the cap portion is placed over the supporting portion 21 of the pressure sensor 1 as shown in FIG. 7. In this way, by forming the non-circular portions on both the outer circumferential surface of the supporting portion 21 and the inner circumferential portion of the cap portion 41 and bringing the engagement portion 41c into engagement with the positioning portion 21c, a rotation preventive construction for the cap portion 41 placed over the supporting portion 21 is provided.

As is shown in FIG. 5, a cut-out plane 41d which is formed into a flat plane is formed in part of the inner circumferential surface of the cap portion 41. These cut-out plane 41d is, as is shown in FIG. 6C, formed in a position which corresponds to the engagement portion 41c formed on the inner circumferential surface of the cap portion 41. Namely, the cut-out plane 41d and the engagement portion 41c are such as to be obtained by forming part of a circumferential wall portion of the cap portion 41 into a flat plate-like shape and are formed on front and rear sides of the flat plate-like portion. Consequently, when the cap portion 41 is seen from the outside, the cut-out plane 41d indicates the position of the engagement portion 41c formed on the inner circumferential surface of the cap portion 41.

Three projecting portions 41e are formed on the inner circumferential surface of the cap portion 41 in positions which confront the engagement portion 41c. The individual projecting portions 41e are formed on an arc-shaped portion which confronts the flat plate-like portion of the cap portion 41, and the respective projecting portions 41e are disposed in a circumferential direction at equal intervals and project individually towards the engagement portion 41c. As is shown in FIG. 6B, the projecting portions 41e are extended from the opening portion 41a to a bottom portion 41b side of the cap portion 41. The projecting portions 41e are formed so that their projecting amount becomes larger on the bottom portion 41b side than on an opening portion 41a side. In the projecting portions 41e of this embodiment, the projecting amount is made larger on the bottom portion 41b side than the opening portion 41a side by forming a sloping surface in the vicinity of the opening portion 41a, and the projecting portions 41e are formed so that their projecting amount becomes constant from where the sloping surface terminates towards the bottom portion 41b side. In addition, sloping surfaces are individually formed to extend over the projecting portions so that the projecting amount increases from the opening portion 41a to the bottom portion 41b.

As is shown in FIG. 6C, two slits 41f, 41f are formed in the circumferential wall portion of the cap portion 41. In this embodiment, the slits 41f, 41f are formed at a boundary portion between one half circumferential portion (a left-hand half portion in FIG. 6C) where the flat plate-like portion is formed and the other half circumferential portion (a right-hand half portion in FIG. 6C) which confronts the flat plate-like portion. The respective slits 41f, 41f are grooves resulting from cutting out the circumferential wall portion of the cap portion 41 and are, as is shown in FIG. 6A, extended from the opening portion 41a towards the bottom portion 41b side to a position lying halfway upwards the height of the cap portion 41 (in a vertical direction in FIG. 6A). The slits 41f may be formed at any other portions on the arc-shaped portion than the flat plate-like portion of the circumferential wall portion of the cap portion 41.

A locking portion 41g is formed on an outer circumferential surface of the bottom portion 41b of the cap portion 41 by a recessed portion which is extended in the circumferential direction. In this embodiment, the locking portion 41g is formed at the arc-shaped portion of the circumferential wall portion of the cap portion 41.

Next, a procedure of assembling the pressure sensor 1 on which the protection member 40 is mounted to the base body 100 will be described, and the function and advantage of the protection member 40 will be described.

Firstly, in a fabrication process of the pressure sensor 1, as is shown in FIG. 5, the cap portion 41 of the protection member 40 is placed over the distal end portion of the supporting portion 21 of the pressure sensor 1, so that the distal portions (the exposed portions) of the contact probes 30 which project from the distal end face 21e of the supporting portion 21 are accommodated within the cap portion 41.

As this occurs, as is shown in FIG. 7, the rotation preventive construction is provided for the cap portion 41 which is placed over the supporting portion 21 by bringing the engagement portion 41c of the cap portion 41 into engagement with the locking portion 21c of the supporting portion 21. The cut-out plane 41d formed on the outer circumferential surface of the cap portion 41 corresponds to the position of the engagement portion 41c and indicates the position of the positioning portion 21c of the supporting portion 21. In the pressure sensor 1 of this embodiment, since the arrangement of the respective contact probes 30 can be grasped based on the positioning portion 21c of the supporting portion 21, the arrangement of the respective contact probes 30 can be grasped using the cut-out plane 41d formed on the outer circumferential surface of the cap portion 41 as a mark.

In addition, the orientation of the pressure sensor 1 can also be grasped by holding the cap portion 41 with a first clamping jig having a contact plane which matches the shape of the cut-out plane 41d of the cap portion 41 and a second clamping jig having a contact plane which matches the shape of the arc-shaped portion of the cap portion 41. Specifically, when the cap portion 41 is held by the two clamping jigs therebetween, in the event that the cap portion 41 is not disposed in a proper orientation, causing the first clamping jig to contact the arc-shaped portion, a space that is to be defined between the two clamping jigs becomes larger than a space that should be defined therebetween when the cap portion 41 is disposed in the proper orientation. Consequently, by measuring the space between the two clamping jigs, the orientation of the pressure sensor 1 can be grasped. In the event that the cap portion 41 is not disposed in the proper orientation, when the cap portion 41 is held by the two clamping jigs therebetween, the cap portion 41 rotates by being guided by the respective contact planes of the clamping jigs, whereby the cap portion 41 is disposed in the proper orientation.

The three projecting portions 41e (refer to FIG. 6C) formed on the inner circumferential surface of the cap portion 41 are pressed against the outer circumferential surface of the supporting portion 21 of the pressure sensor 1 when the cap portion 41 is placed over the supporting portion 21 of the pressure sensor 1, whereby the cap portion is fitted on the supporting portion 21 with a sufficient pressure. Therefore, the engagement portion 41c of the cap portion 41 and the positioning portion 21c of the supporting portion 21 are brought into engagement with each other in an ensured fashion.

Since the projecting amount of the projecting portions 41e is smaller on the opening portion 41a side of the cap portion 41 when the cap portion 41 is placed over the supporting portion 21 of the pressure sensor 1, the supporting portion 21 can be inserted smoothly into the cap portion 41. In addition, since the projecting amount is larger on the bottom portion 41b side of the cap portion 41, the cap portion 41 can be fitted on the supporting portion 21 with the sufficient pressure.

Even in the event that an interference between the cap portion 41 and the supporting portion 21 is small due to dimensional tolerance of an inside diameter of the cap portion 41 or an outside diameter of the supporting portion 21, the inside diameter of the cap portion 41 is increased by the slit 41f being opened in a width direction when the cap portion 41 is placed over the supporting portion 21, whereby the supporting portion 21 can smoothly be inserted into the interior of the cap portion 41.

In this way, an assembling process is started of assembling the pressure sensor 1 on to the vehicle brake fluid controlling unit U (refer to FIG. 1) in such a state that the cap portion 41 of the protection member 40 is placed over the supporting portion 21 of the pressure sensor 1 so that the respective contact probes 30 are accommodated within the cap portion 41.

As is shown in FIG. 7, in the assembling process of the pressure sensor 1, the proximal end portion of the pressure sensor 1 is inserted into the mounting hole 151 formed in the front side surface 101 of the base body 100. As this occurs, the arrangement of the respective contact probes 30 which are accommodated within the cap portion 41 can be grasped by using the cut-out plane 41d provided on the outer circumferential surface of the cap portion 41 of the protection member 40 as the mark. Then, as is shown in FIG. 4, the orientation of the pressure sensor 1 is set using the cut-out plane 41d of the cap portion 41 as the mark so that the respective contact probes 30 are electrically connected to the corresponding connecting portions 302 of the control circuit board 301 (refer to FIG. 2) of the control unit 300 in a proper fashion. After the proximal end portion of the pressure sensor 1 has been inserted into the mounting hole 151 of the base body 100 in the way described above, an open edge portion of the mounting hole 151 is crimped, so that the pressure sensor 1 is secured to the base body 100.

In this embodiment, the cap portion 41 is formed of the conductive member, and as is shown in FIG. 7, the cap portion 41 is electrically connected to the sensor housing 20 of the pressure sensor 41. Consequently, since static electricity which flows to the cap portion 41 from the outside is released from the sensor housing 20 via the base body 100 so that the cap portion 41 is grounded, the electric circuits of the detecting portion 10 (refer to FIG. 4) within the sensor housing 20 can be prevented from being affected by static electricity.

The cap portion 41 is removed from the supporting portion 21 after the pressure sensor 1 has been assembled to the base body 100 and the electronic control unit 300 is assembled to the base body 100. By doing so, as is shown in FIG. 4, the respective contact probes 30 are brought into contact with the corresponding connecting portions 302 of the control circuit board 301 (refer to FIG. 4), whereby the pressure sensor 1 and the control circuit board 301 are electrically connected together. As is shown in FIG. 6A, since the locking portion 41g is formed at the bottom portion 41b of the cap portion 41, when mounting or dismounting the cap portion 41 on or from the supporting portion 21 of the pressure sensor 1, the cap portion 41 can easily be mounted or dismounted on or from the supporting portion 21 by gripping the locking portion 41g of the cap portion 41.

According to the protection member 40 of the embodiment, as is shown in FIG. 7, since the arrangement of the respective contact probes 30 can be grasped even in such a state that the cap portion 41 is placed over the supporting portion 21 of the pressure sensor 1, the pressure sensor 1 can accurately be assembled on to the base body 100 in such a state that the respective contact probes 30 are accommodated within the cap portion 41. In the case of the cap portion 41 being placed over the supporting portion 21 in the fabricating process of the pressure sensor 1, since the contact probes 30 are not exposed to the outside from the fabricating process of the pressure sensor 1 to the completion of the assembling process, not only can sticking of dirt to the contact probes 30 be prevented in an ensured fashion, but also the electric circuits of the detecting portion 10 (refer to FIG. 4) within the sensor housing 20 can be prevented from being affected by static electricity.

Thus, while the embodiment of the invention has been described heretofore, the invention is not limited to the embodiment but can be modified as required with respect to the design thereof without departing from the spirit and scope thereof. In the embodiment described above, while the arrangement of the respective contact probes 30 which are accommodated within the cap portion 41 are grasped using as the mark the cut-out plane 41d formed on the outer circumferential surface of the cap portion 41 as is shown in FIG. 5, the form of the mark used to grasp the arrangement of the respective contact probes 30 is not limited thereto. For example, the mark used to grasp the arrangement of the respective contact probes 30 may be formed by forming or printing a projecting portion on the outer circumferential surface of the cap portion 41 in the position which corresponds to the engagement portion 41c (refer to FIG. 6C).

In the embodiment described above, while the three projecting portions 41e are formed on the inner circumferential surface of the cap portion in the positions which confront the engagement portion 41c as is shown in FIG. 6C, the number and shape of the projecting portions 41e are not limited to those described in the embodiment. In the embodiment described above, while the two slits 41f, 41f are formed in the circumferential wall portion of the cap portion 41, the number and shape of the slit portions 41f are not limited to those described in the embodiment. In the embodiment described above, while the locking portion 41g is formed by forming the recessed portion at the bottom portion 41b of the cap portion 41 as is shown in FIG. 6A, a locking portion may be formed by forming a raised portion on the outer circumferential surface of the cap portion 41. In the embodiment, while the cap portion 41 shown in FIG. 5 is formed of the synthetic resin having electrical conductivity, the material is not limited to a synthetic resin, and hence, a metallic material having electrical conductivity, for example, may be used as the material of the cap portion 41.

What is claimed is:

1. An electric part protection member for a projecting contact terminal which projects from a supporting portion of an electric part, comprising a bottomed cylindrical cap portion structured to be detachably placed over the supporting portion, wherein:

the cap portion is formed of a conductive member; and when the cap portion is placed over the supporting portion, the cap portion is electrically connected to a housing of the electric part, and the contact terminals are spaced apart from the cap portion.

2. The electric part protection member according to claim 1, further comprising:

an engagement portion, formed on an inner circumferential surface of the cap portion, the engagement portion being adapted to be brought into engagement with a positioning portion formed on an outer circumferential surface of the supporting portion; and a mark, indicating a position of the engagement portion, the mark being provided on an outer surface of the cap portion.

3. The electric part protection member according to claim 2, wherein:

the cap portion is a bottomed cylindrical member; and the mark is a flat plane formed on part of an outer circumferential surface of the cap portion.

4. The electric part protection member according to claim 2, further comprising a projecting portion, formed on the inner circumferential surface of the cap portion in a position which confronts the engagement portion.

5. The electric part protection member according to claim 4, wherein the projecting portion is extended from an opening portion of the cap portion towards a bottom portion side, with a larger extending amount on the bottom portion side than an opening portion side.

6. The electric part protection member according to claim 2, wherein the cap portion is formed with a slit extended from the opening portion to the bottom portion side.

7. The electric part protection member according to claim 2, further comprising a locking portion, formed on the outer circumferential surface of the cap portion, the locking portion being a raised portion extended in a circumferential direction.

8. The electric part protection member according to claim 2, further comprising a locking portion, formed on the outer circumferential surface of the cap portion, the locking portion being a recessed portion extended in a circumferential direction.

9. The electric part protection member according to claim 2, wherein the cap portion is formed by a conductive member and is electrically connected with a housing of the electric part.

10. The electric part protection member according to claim 2, wherein the electric part is a pressure sensor for use in a vehicle brake fluid pressure controlling unit and is designed to measure a brake fluid pressure within a fluid line which connects a master cylinder with a wheel brake.

11. The electric part protection member according to claim 1, wherein the supporting portion extends from the housing, and has a diameter smaller than the housing.

12. The electric part protection member according to claim 1, wherein the cap portion comprises an engagement portion that comprises a flat plane.

13. The electric part protection member according to claim 12, wherein the supporting portion has a flat side surface for engaging with the engagement portion.

14. The electric part protection member according to claim 1, wherein the cap portion comprises a cut-out plane which corresponds to an engagement portion formed on an inner circumferential surface of the cap portion, by forming part of a circumferential wall portion of the cap portion into a flat plate-like shape.

15. The electric part protection member according to claim 1, further comprising projecting portions formed on an inner circumferential surface of the cap portion.

16. The electric part protection member according to claim 15, wherein the projecting portions are arc shaped.

17. The electric part protection member according to claim 15, wherein the projecting portions extend from a bottom portion to an opening side of the cap portion.

18. The electric part protection member according to claim 15, wherein the projecting portions become larger at a bottom portion than at an opening side of the cap portion.

19. The electric part protection member according to claim 15, further comprising slits formed in a circumferential wall of the cap portion at a first circumferential portion which confronts a flat plate like portion on another circumferential portion of the cap.

20. An assembling method for an electric part, comprising:
placing a cap portion of a protection member for a projecting contact terminal which projects from a supporting portion of an electric part, comprising a bottomed cylindrical cap portion adapted to be detachably placed over the supporting portion, on the supporting portion of the electric part; and
mounting the housing of the electric part on an other different part in a state that the cap portion is placed over the supporting portion, wherein:
the cap portion is formed of a conductive member;
when the cap portion is placed over the supporting portion, the cap portion is electrically connected to a housing of the electric part, and the contact terminals are spaced apart from the cap portion; and
when the mounting, static electricity, which flows to the cap portion from the outside, is released from the housing of the electric part via the other different part so that the cap portion is grounded.

* * * * *